Figure 1:
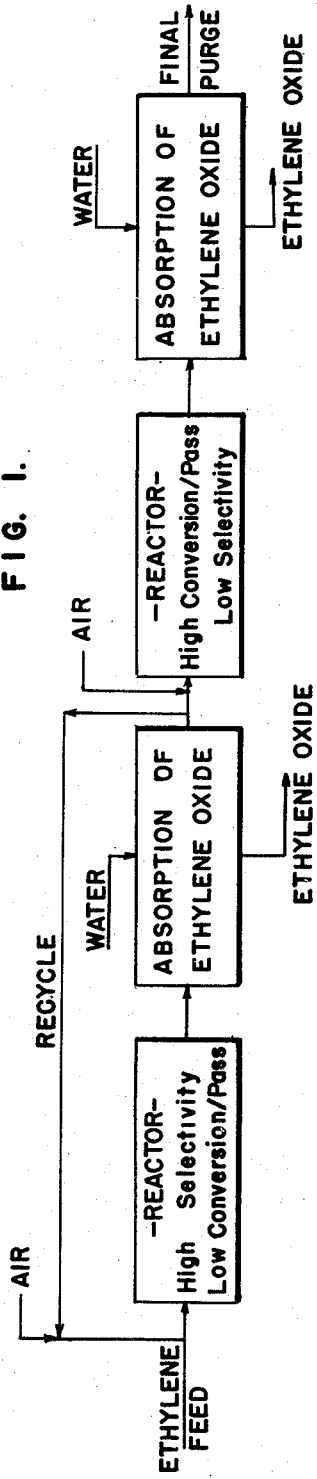

Nov. 2, 1954    R. B. EGBERT    2,693,474
OXIDATION OF OLEFINS
Filed Dec. 28, 1950

INVENTOR.
Robert B. Egbert
BY
*Semmes, Keogin, Potomus & Semmes*
ATTORNEYS 2,693,474

OXIDATION OF OLEFINS

Robert B. Egbert, Roslyn Heights, N. Y., assignor to Chempatents, Inc., New York, N. Y., a corporation of Delaware Application December 28, 1950, Serial No. 203,119

11 Claims. (Cl. 260—348.5)

The present invention relates to the manufacture of olefin oxides by direct oxidation in the presence of catalysts, and has particular reference to an improved procedure for increasing the overall yield of olefin oxide, increasing the efficiency of the system.

Olefin oxides such as ethylene oxide are formed by passing a gaseous reaction mixture of ethylene and a source of oxygen such as air, through a reactor containing silver catalyst. Inert gases such as nitrogen normally form a part of the reaction mixture, in order to stabilize the system against excessive conditions of reaction such as heat. The ethylene oxide end product is recovered from the reaction mixture, which is recycled with proper adjustment of the proportion of ethylene and oxygen constituents. A portion of the gaseous reaction mixture corresponding in volume to the volume of the new components added, is purged from the system. This purge results in loss of unconverted ethylene which seriously lowers the efficiency of the process.

In application Serial No. 159,839, filed May 3, 1950, it is proposed to carry out the oxidation reaction employing commercial gases containing ethylene in dilute concentration as the starting material. The olefin component of the gaseous reaction stream is selectively oxidized at a temperature of 240° C.–320° C. under a pressure of from 8 to 20 atmospheres. Hydrogen and unsaturated hydrocarbons other than olefins are preoxidized, and may remain in the reaction stream as inert gases.

In copending application Serial No. 160,913, filed May 9, 1950, it is proposed further that the olefin content of the commercial gases be solvent extracted, and the relatively pure olefin mixed with oxygen and inert gases to form the reaction mixture.

It is an object of the present invention to effect further economies in the aforementioned processes for the oxidation of olefins as well as commercial processes currently in use, increasing the overall yield in terms of olefin oxide.

A further object is to improve processes for the manufacture of olefin oxides wherein commercial gases containing olefins in relatively dilute concentration are employed as starting materials.

A further object is to provide a novel procedure for use in connection with processes for the manufacture of ethylene oxide, wherein a portion of the gaseous reaction mixture is recycled through the system under controlled conditions of reaction whereby loss of ethylene from purging is minimized.

A further object is to provide an improved process for the manufacture of ethylene oxide wherein maximum selectivity is attained at an economical conversion level, resulting in the highest attainable efficiency at the lowest working and capital cost.

Other objects and advantages of the invention will be apparent from the following detailed description thereof taken in connection with the attached flow diagram wherein Figures 1 and 2 set forth diagrammatically, systems embodying the present invention, and the specific examples set forth hereinafter by way of description and amplification of the advantages of the invention.

In its broadest application, the invention comprehends the formation of a gaseous reaction mixture of olefin and a source of oxygen, for example, ethylene and air, for the direct oxidation of the ethylene component in the presence of a silver catalyst, at temperatures of from 220° C.–350° C. and with pressures from 0–25 atmospheres gauge. The system employed is similar to that disclosed in application Serial No. 159,839, wherein the gaseous reaction mixture is passed through a reactor and ethylene oxide formed scrubbed from the gaseous stream. The cleansed stream is recycled in the system, with the addition of ethylene and air to fortify the reactant proportions for further processing. A portion of the cleansed recycle gases must be purged from the system to compensate for the added reactants, and the purge gas will contain unconverted ethylene, which normally is lost to the process.

In commercial operations using this basic process, as high as 20% of the feed ethylene may be lost in the purge gases. This loss seriously deteriorates the operating efficiency of the process. It is suggested that the purge gases be subjected to a secondary processing, to oxidize residual ethylene in the purge gases, thereby at least partially eliminating the loss of ethylene to the process.

It has now been discovered that by proper adjustment of the selectivity ratio of the primary ethylene oxidation reaction, with the conversion per pass ratio, this serious defect in operational efficiency is eliminated. The reaction stream in the primary oxidation reaction is maintained under reaction conditions attaining high selectivity but with low single pass yields. In combination with this step, the purge gases are subjected to a secondary ethylene oxidation reaction under conditions attaining a maximum yield of ethylene oxide for a single pass operation.

The term "selectivity" as used herein designates the ratio $$\frac{\text{ethylene oxide formed}}{\text{ethylene reacted}}$$

By "maximum selectivity," it is meant that of the ethylene reacted, approximately 70% or more of ethylene oxide is formed. The term "conversion" as used herein designates the ratio $$\frac{\text{ethylene reacted}}{\text{ethylene fed}}$$

The term "yield" as used herein designates the ratio $$\frac{\text{ethylene oxide}}{\text{ethylene fed}}$$

Under the preferred method of operation, maximum selectivity is attained using a reaction stream containing 5% ethylene by volume. To attain maximum selectivity, the conversion per pass should not exceed appreciably 30 to 40%. It will be apparent that the gaseous reaction mixture, reacted under conditions set forth hereinafter to attain these optimum results, will contain considerable unreacted ethylene in the recycle gas, an appreciable portion of which normally is lost in the purge gas.

In accordance with the invention, with recycle gases subjected to the aforesaid conditions of reaction in the primary reactor, the purge gases drawn off from the recycle gases are subjected to a secondary oxidation reaction, whereby residual ethylene in the purge gases is converted to ethylene oxide and recovered as valuable end product. As shown diagrammatically in Figure 1 of the flow diagram, the secondary oxidation reaction is characterized by maintenance of an optimum conversion ratio for a single pass operation, whereby some 42% of the ethylene otherwise lost to waste is recovered. The ethylene oxide is recovered from the purge gas in a water scrubbing operation, for recovery in the usual manner.

As an alternative procedure, the purge gas may be recycled after it has been passed over the catalyst in the secondary reactor, to reduce the ethylene concentration in the gases initially entering the secondary reactor. The purge gas is cycled to the point of introduction of the gaseous reaction mixture into the secondary reactor, being mixed with an oxygen bearing gas in suitable proportion for the oxidation step. In both procedures, the final purge gas may be vented to atmosphere.

Figure 2:
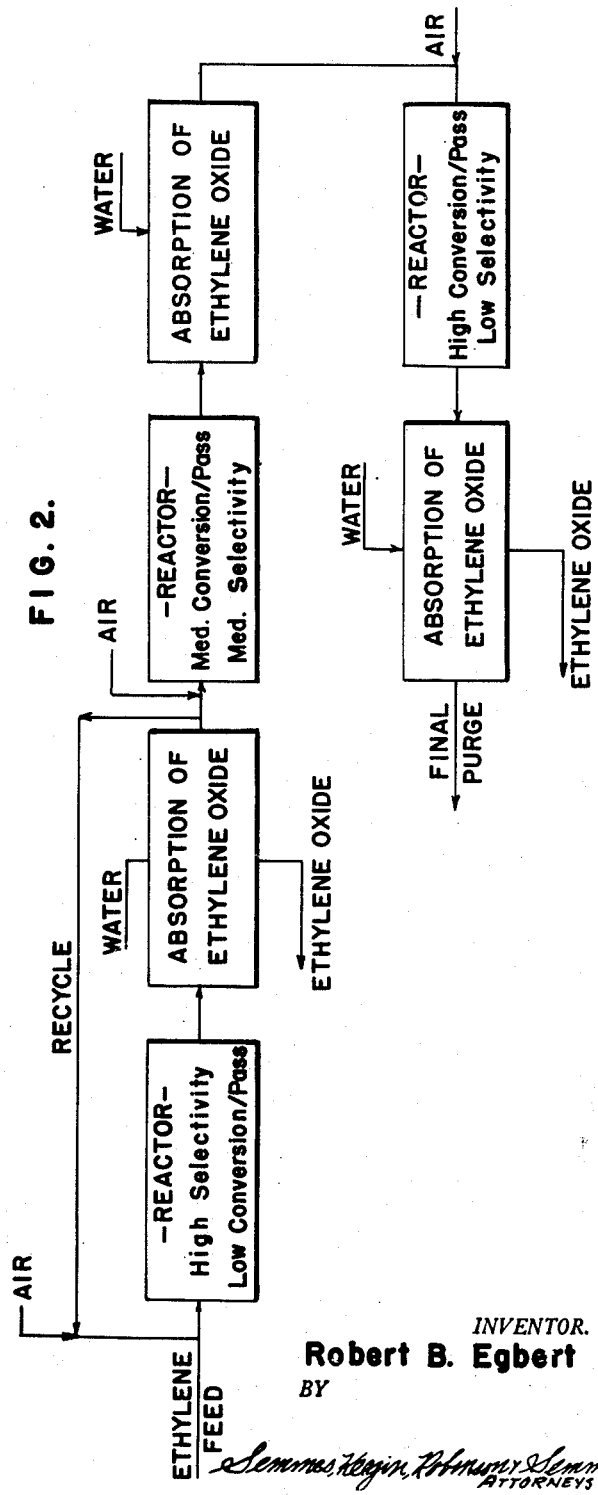

A third alternative procedure is set forth diagrammatically in Figure 2 of the drawings, wherein the initial feed gas is pased through the primary reactor operated on the recycle basis as prescribed above, for maximum selectivity at an economic conversion level. The purge gases withdrawn to bleed inert gases from the system are passed through two or more secondary reactors in series, after admixture of additional air, under conditions of maximum single pass yield or conversion, the ethylene oxide end product being recovered in each instance by a conventional water wash. This procedure results in the highest practical attainable efficiency at the lowest working and capital cost, in most cases.

The control of the selectivity and conversion ratios is accomplished by modifying the reaction conditions within the range of preferred operative reaction conditions set forth hereinafter. Generally, an increase in the severity of the reaction conditions will increase the conversion ratio, the maximum conditions being dictated by the point where decomposition of the ethylene oxide end product sets in, whereby the overall yield per pass drops. With the temperature of reaction constant, a moderate degree of control over the reaction can be attained by changing the rate of flow of the feed gas over the catalyst.

For example, an increase of the flow rate from 300 cubic feet per hour per reaction tube to 600 cubic feet per hour, a relatively high flow rate, will decrease the conversion ratio. With a relatively low temperature, for example, 245° C., and a flow rate of 300 to 600 cubic feet per hour, a relatively low conversion ratio and high selectivity will result. As the reaction temperature is raised, for example to 290° C., the conversion is increased.

Thus, using a gas stream containing 5% ethylene by volume at a flow rate of 600 cubic feet per hour at a temperature of 265° C., a conversion of 23.9% and a selectivity of 72.1% was attained. By slowing down the rate of flow to 300 cubic feet per hour at a temperature of 265° C., a conversion of 41.2% with a selectivity of 62.8% was attained.

With a temperature of from 270° C. to 280° C., with a time of contact with the catalyst in the order of three and one half seconds, using a 5% ethylene stream as in the primary reactor, a conversion ratio of 30% was attained with a selectivity of 70%. On the other hand, with a temperature range of from 275° C.–285° C. with a time of contact with the catalyst in the order of from five to six seconds, using a 3½% ethylene stream as in the secondary reactor, a conversion per pass of 70% was attained, and a selectivity of 52%.

In order to more clearly explain the marked advantages attained by the process of the invention, specific examples of ethylene oxidation reactions carried out in accordance with the principles of the invention are set forth hereinafter.

Example A

A gaseous reaction mixture or feed gas of air, ethylene and recycle gas, was fed to a primary reactor containing 20 feet of silver catalyst, at a temperature of 270° C., with approximately 3.5 seconds time of contact with the catalyst. The gaseous reaction mixture was comprised as follows:

| | Per cent |
|---|---|
| Ethylene | 5.0 |
| Oxygen | 6.0 |
| Carbon dioxide | 7.6 |
| Nitrogen | 81.4 |
| | 100.0 |

After reaction, the reaction mixture contained on a dry basis:

| | Per cent |
|---|---|
| Ethylene | 3.5 |
| Oxygen | 4.1 |
| Carbon dioxide | 8.5 |
| Ethylene oxide | 1.05 |
| Nitrogen | 82.8 |
| | 100.0 |

The selectivity was 70%, the conversion 30%, and the yield 21%.

For every 100 mols of feed gas, about 10.5 mols must be purged from the system, for purposes of the recycling step. In this instance, the purge gas contained 3.5% ethylene. Approximately 1.3 mols of air were added to raise the oxygen concentration in the purge gas to 6.0%. The purge gas thus modified had a composition:

| | Per cent |
|---|---|
| Ethylene | 3.1 |
| Oxygen | 6.0 |
| Carbon dioxide | 7.6 |
| Nitrogen | 83.3 |
| | 100.0 |

The purge gas was then passed through a secondary reactor containing 40 feet of silver catalyst with a contact time of between one and two seconds. The resulting gas had the following composition, on a dry basis:

| | Per cent |
|---|---|
| Ethylene | 0.7 |
| Oxygen | 2.2 |
| Carbon dioxide | 9.7 |
| Ethylene oxide | 1.3 |
| Nitrogen | 86.1 |
| | 100.0 |

The selectivity was 55%, the conversion 76%, and the yield 42%. The total end product, ethylene oxide, obtained from the primary and secondary reactors, was 1.203 mols, 1.05 mols being obtained from the primary reactor. The total ethylene consumed was:

| | Mols |
|---|---|
| To make oxide | 1.203 |
| To make CO$_2$ in primary reactor | 0.45 |
| To make CO$_2$ in secondary reactor | 0.125 |
| Lost in final purge | 0.085 |
| Total | 1.863 |

The industrial efficiency of the process was 64.5%.

If no secondary reactor were used for treatment of the purge gases, the ethylene consumed would have been:

| | Mols |
|---|---|
| To make oxide | 1.05 |
| To make CO$_2$ | 0.45 |
| Lost in purge | .37 |
| | 1.87 |

The industrial efficiency would have been 56%. Accordingly, the use of the secondary reactor resulted in an increase in industrial efficiency of 8.5%, which would amount to an increase in overall production of 0.13 lb. of ethylene oxide per pound of ethylene fed.

Example B

A feed gas of air, ethylene and recycle gas, as in Example A, were passed through the primary reactor, 11.8 mols of purge gas having a composition:

| | Per cent |
|---|---|
| Ethylene | 3.1 |
| Oxygen | 6.0 |
| Carbon dioxide | 7.6 |
| Nitrogen | 83.3 |
| | 100.0 | were passed through a first purge gas reactor, which was operated to obtain a yield of about 30%. The composition of the purge gas at the outlet of the first purge gas reactor was:

| | Per cent |
|---|---|
| Ethylene | 1.8 |
| Oxygen | 4.2 |
| Carbon dioxide | 8.5 |
| Ethylene oxide | 0.9 |
| Nitrogen | 84.6 |
| | 100.0 |

The selectivity was 67%, the conversion 43% and the yield 29%. The ethylene oxide was removed with a water wash and 1.2 mols of air added to the purge gas to bring the concentration of oxygen up to 6%. The reconstituted feed gas then had a composition:

| | Per cent |
|---|---|
| Ethylene | 1.6 |
| Oxygen | 6.0 |
| Carbon dioxide | 7.7 |
| Ethylene oxide | 0.0 |
| Nitrogen | 84.7 |
| | 100.0 |

This mixture was then passed through a second purge gas reactor having 20 feet of catalyst in it. The composition of the final purge gas at the outlet of the second purge gas reactor was:

|             | Per cent |
| --- | --- |
| Ethylene | 0.25 |
| Oxygen | 3.8 |
| Carbon dioxide | 8.9 |
| Ethylene oxide | 0.75 |
| Nitrogen | 86.3 |
|  | 100.0 |

The selectivity was 55%, the conversion 85% and the yield 47%. The ethylene consumption was as in Example A. The overall production of ethylene oxide was:

|  | Mols |
| --- | --- |
| In primary reactor | 1.05 |
| In first purge reactor | .106 |
| In second purge reactor | .097 |
| Total | 1.253 |

As before, the ethylene consumption was 1.87 mols as follows:

|  |  |
| --- | --- |
| To make ethylene oxide | 1.253 |
| To make $CO_2$ in primary reactor | 0.45 |
| To make $CO_2$ in 1st purge gas reactor | 0.053 |
| To make $CO_2$ in 2nd purge gas reactor | 0.080 |
| Lost in final purge | 0.033 |
|  | 1.869 |

Hence, the overall industrial efficiency of the process was 67%, as compared to 64.5% for the case where one purge reactor was used, and 56% where no purge reactor was used, an overall net increase of 11 percentage points. The overall yield of ethylene oxide per pound of ethylene consumed increased by 0.17 pound. It is evident that the method of the invention attains a marked economic advantage over conventional processes.

The method of the invention may be employed with any type of reactor system, for example, employing fixed or fluidized catalyst beds, and with any type of catalyst. The method has particular advantage when used in connection with oxidation reactions carried out under pressure of from five to twenty-five atmospheres, which markedly increases the efficiency of the water scrubbing oxide recovery step, which is important in view of the relatively low concentration of ethylene oxide in the feed gases. As the scrubbing steps eliminate impurities found in small traces in the gaseous stream, a maximum efficiency of catalyst is maintained.

The oxidation of ethylene preferably may be carried out under operative reaction conditions of 220°–350° C. temperature, and pressures of 0–25 atmospheres gauge, using ethylene in concentration of 1%–6%, with oxygen present in an amount from 5–18%. The operating conditions for the primary reactor, and the one or more secondary reactors, obviously will vary within these limits to attain the desired objectives of conversion, selectivity and yield prescribed as essential for maximum operating efficiency.

The method of the invention is used advantageously in connection with use of dilute feed gases as the source of ethylene, set forth in the co-pending application Serial Nos. 159,839 and 160,913, where the amount of feed gas removed in the purge, is greater than normal, which in turn would tend to decrease the overall efficiency of the method due to loss of ethylene.

While the invention has been described with reference to specific embodiments and examples shown herein, it is not to be regarded as limited thereby save as defined in the appended claims.

I claim:

1. A catalytic process for making olefin oxide by the oxidation of an olefin which comprises passing a gaseous reaction mixture containing oxygen and the olefin over a first silver catalyst at a temperature in the range of about 220 to about 350° C. and a contact time in the range of about 1 to 6 seconds to give a conversion in the lower part of the range of about 23 to about 85%, removing olefin oxide from the resulting mixture, purging a portion of the remaining gaseous mixture and recycling the remaining portion over said catalyst, and passing the purged gaseous mixture over a second silver catalyst at a temperature in the range of about 220 to about 350° C. and a contact time in the range of about 1 to 6 seconds to give a conversion in the upper part of the range of about 23 to about 85%, said conversion being the ratio of the olefin reacted relative to the olefin fed, the yield of olefin oxide formed relative to the olefin reacted being higher at a relatively lower conversion, and recovering the resulting olefin oxide.

2. A catalytic process for making ethylene oxide by the oxidation of ethylene which comprises passing a gaseous reaction mixture containing oxygen and ethylene over a first silver catalyst at a temperature in the range of about 220 to about 350° C. and a contact time in the range of about 1 to 6 seconds to give a conversion in the lower part of the range of about 23 to about 85%, removing ethylene oxide from the resulting mixture purging a portion of the remaining gaseous mixture and recycling the remaining portion over said catalyst, and passing the purged gaseous mixture over a second silver catalyst at a temperature in the range of about 220 to about 350° C. and a contact time in the range of about 1 to 6 seconds to give a conversion in the upper part of the range of about 23 to about 85%, said conversion being the ratio of the ethylene reacted relative to the ethylene fed, the yield of ethylene oxide formed relative to the ethylene reacted being higher at a relatively lower conversion, and recovering the resulting ethylene oxide.

3. A catalytic process for making olefin oxide by the oxidation of an olefin which comprises passing a gaseous reaction mixture containing oxygen and the olefin over a first silver catalyst at a temperature in the range of about 220 to about 350° C. and a contact time in the range of about 1 to 6 seconds to give a conversion in the lower part of the range of about 23 to about 85%, removing olefin oxide from the resulting mixture, purging a portion of the remaining gaseous mixture and recycling the remaining portion over said catalyst, adding oxygen-containing gas to the purged gaseous mixture and passing the resulting mixture over a second silver catalyst at a temperature in the range of about 220 to about 350° C. and a contact time in the range of about 1 to 6 seconds to give a conversion in the upper part of the range of about 23 to about 85%, said conversion being the ratio of the olefin reacted relative to the olefin fed, the yield of olefin oxide formed relative to the olefin reacted being higher at a relatively lower conversion, and recovering the resulting olefin oxide.

4. A catalytic process for making ethylene oxide by the oxidation of ethylene which comprises passing a gaseous reaction mixture containing oxygen and 1 to 6% ethylene over a first silver catalyst at a temperature in the range of about 220 to about 350° C. and a contact time in the range of about 1 to 6 seconds to give a conversion in the lower part of the range of about 23 to about 85%, removing ethylene oxide from the resulting mixture, purging a portion of the remaining gaseous mixture and recycling the remaining portion over said catalyst, adding oxygen-containing gas to the purged gaseous mixture and passing the resulting mixture over a second silver catalyst at a temperature in the range of about 220 to about 350° C. and a contact time in the range of about 1 to 6 seconds to give a conversion in the upper part of the range of about 23 to about 85%, said conversion being the ratio of the ethylene reacted relative to the ethylene fed, the yield of ethylene oxide formed relative to the ethylene reacted being higher at a relatively lower conversion, and recovering the resulting ethylene oxide.

5. A catalytic process for making ethylene oxide by the oxidation of ethylene which comprises passing a gaseous reaction mixture containing oxygen and 1 to 6% ethylene over a first silver catalyst at a temperature in the range of about 220 to about 350° C. and a contact time in the range of about 1 to 6 seconds to give a conversion in the lower part of the range of about 23 to about 85%, removing ethylene oxide from the resulting mixture, purging a portion of the remaining gaseous mixture and recycling the remaining portion over said catalyst, adding oxygen-containing gas to the purged gaseous mixture and passing the resulting mixture over a second silver catalyst at a temperature in the range of about 220 to about 350° C. and a contact time in the range of about 1 to 6 seconds to give a conversion in the upper part of the range of about 23 to about 85%, removing ethylene oxide from the gaseous mixture which leaves the second catalyst, purging a portion of the remaining gaseous mixture and recycling the remaining portion over said second catalyst, adding oxygen-containing gas to the latter purged gas and passing the resulting mixture over a third silver catalyst at a temperature and a contact time within said ranges to give a higher conversion than that in the second catalytic treating step, said conversion being the ratio of ethylene reacted relative to ethylene fed, the yield of ethylene oxide formed relative to ethylene reacted being higher at a relatively lower conversion, and recovering the resulting ethylene oxide.

6. A catalytic process for making ethylene oxide by the oxidation of ethylene which comprises passing a gaseous reaction mixture containing oxygen and 1 to 6% ethylene over a first silver catalyst at a temperature in the range of about 220 to about 350° C. and a contact time in the range of about 1 to 6 seconds to give a conversion in the lower part of the range of about 23 to about 85%, removing ethylene oxide from the resulting mixture, purging a portion of the remaining gaseous mixture and recycling the remaining portion over said catalyst, adding oxygen-containing gas to the purged gaseous mixture and passing the resulting mixture over a second silver catalyst at a temperature in the range of about 220 to about 350° C. and a contact time in the range of about 1 to 6 seconds to give a conversion in the upper part of the range of about 23 to about 85%, the second catalytic treating step being carried out at a higher temperature than the first catalytic treating step, said conversion being the ratio of the ethylene reacted relative to the ethylene fed, the yield of ethylene oxide formed relative to the ethylene reacted being higher at a relatively lower conversion, and recovering the resulting ethylene oxide.

7. A catalytic process for making ethylene oxide by the oxidation of ethylene which comprises passing a a gaseous reaction mixture containing oxygen and 1 to 6% ethylene over a first silver catalyst at a temperature in the range of about 220 to about 350° C. and a contact time in the range of about 1 to 6 seconds to give a conversion in the lower part of the range of about 23 to about 85%, removing ethylene oxide from the resulting mixture, purging a portion of the remaining gaseous mixture and recycling the remaining portion over said catalyst, adding oxygen-containing gas to the purged gaseous mixture and passing the resulting mixture over a second silver catalyst at a temperature in the range of about 220 to about 350° C. and a contact time in the range of about 1 to 6 seconds to give a conversion in the upper part of the range of about 23 to about 85%, removing the ethylene oxide from the gaseous mixture resulting from the second catalytic treating step, purging a portion of the remaining gaseous mixture and recycling the resulting remainder over the second catalyst, said conversion being the ratio of the ethylene reacted relative to the ethylene fed, the yield of ethylene oxide formed relative to the ethylene reacted being higher at a relatively lower conversion, and recovering the resulting ethylene oxide.

8. A catalytic process for making ethylene oxide by the oxidation of ethylene which comprises continuously passing a gaseous reaction mixture containing oxygen and 1 to 6% ethylene over a first silver catalyst at a temperature in the range of about 220 to about 350° C. and a contact time in the range of about 1 to 6 seconds to give a conversion below about 50% and in the lower part of the range of about 23 to about 85%, removing ethylene oxide from the resulting mixture, purging a portion of the gaseous mixture and recycling the remaining portion over said catalyst, adding oxygen-containing gas to the purged gaseous mixture and passing the resulting mixture over a second silver catalyst at a temperature in the range of about 220 to about 350° C. and a contact time in the range of about 1 to 6 seconds to give a conversion in the upper part of the range of about 23 to about 85%, removing the ethylene oxide from the gaseous mixture resulting from the second catalytic treating step, purging a portion of the remaining gaseous mixture and recycling the resulting remainder over the second catalyst, said conversion being the ratio of the ethylene reacted relative to the ethylene fed, the yield of ethylene oxide formed relative to the ethylene reacted being higher at a relatively lower conversion, and recovering the resulting ethylene oxide.

9. A catalytic process for making ethylene oxide by the oxidation of ethylene which comprises continuously passing a gaseous reaction mixture containing oxygen and 1 to 6% ethylene over a first silver catalyst at a temperature in the range of about 220 to about 350° C. and a contact time in the range of about 1 to 6 seconds to give a conversion in the lower part of the range of about 23 to about 50%, removing the ethylene oxide from the resulting mixture, purging a portion of the gaseous mixture and recycling the remaining portion over said catalyst, adding oxygen-containing gas to the purged gaseous mixture and passing the resulting mixture over a second silver catalyst at a temperature in the range of about 220 to about 350° C. and a contact time in the range of about 1 to 6 seconds to give a conversion in the upper part of the range of about 23 to about 50%, removing the ethylene oxide from the gaseous mixture resulting from the second catalytic treating step, purging a portion of the remaining gaseous mixture and recycling the resulting remainder over the second catalyst, said conversion being the ratio of the ethylene reacted relative to the ethylene fed, the yield of ethylene oxide formed relative to the ethylene reacted being higher at a relatively lower conversion, and recovering the resulting ethylene oxide.

10. A catalytic process for making ethylene oxide by the oxidation of ethylene which comprises passing a gaseous reaction mixture containing oxygen and about 5% ethylene over a first silver catalyst at a temperature of about 270° C. for a contact time of about 1 second to give a conversion in the lower part of the range of about 23 to about 85%, removing ethylene oxide from the resulting gaseous mixture, purging a portion of the gaseous mixture and recycling the remaining portion over said catalyst, adding oxygen-containing gas to the purged gaseous mixture to form a gaseous mixture containing about 3.5% ethylene and passing the latter mixture over a second silver catalyst at a temperature of about 285° C. and a contact time in the range of about 1 to 3 seconds to give a conversion in the upper part of the range of about 23 to about 85%, said conversion being the ratio of the ethylene reacted relative to the ethylene fed, the yield of ethylene oxide formed relative to the ethylene reacted being higher at a relatively lower conversion, and recovering the resulting ethylene oxide.

11. A catalytic process for making ethylene oxide by the oxidation of ethylene which comprises passing a gaseous reaction mixture containing oxygen and about 5% ethylene over a first silver catalyst at a temperature of about 270 to 280° C. for a contact time of about 3.5 seconds to give a conversion in the lower part of the range of about 23 to about 85%, removing ethylene oxide from the resulting gaseous mixture, purging a portion of the gaseous mixture and recycling the remaining portion over said catalyst, adding oxygen-containing gas to the purged gaseous mixture to form a gaseous mixture containing about 3.5% ethylene and passing the latter mixture over a second silver catalyst at a temperature of about 275 to 285° C. and a contact time in the range of about 5 to 6 seconds to give a conversion in the upper part of the range of about 23 to about 85%, the second catalytic treating step being carried out at a higher temperature than the first catalytic treating step, said conversion being the ratio of the ethylene reacted relative to the ethylene fed, the yield of ethylene oxide formed relative to the ethylene reacted being higher at a relatively lower conversion, and recovering the resulting ethylene oxide.

References Cited in the file of this patent

UNITED STATES PATENTS

| Number | Name | Date |
| --- | --- | --- |
| 2,245,183 | Christ | June 10, 1941 |
| 2,393,240 | Dreyfus | Jan. 22, 1946 |
| 2,437,930 | Bergsteinsson | Mar. 16, 1948 |
| 2,458,266 | Heider | Jan. 4, 1949 |

FOREIGN PATENTS

| Number | Country | Date |
| --- | --- | --- |
| 472,629 | Great Britain | 1937 |
| 531,256 | Great Britain | 1941 |
| 560,770 | Great Britain | 1942 |
| 573,575 | Great Britain | Nov. 27, 1945 |